United States Patent
Ayers

(10) Patent No.: US 9,342,865 B2
(45) Date of Patent: May 17, 2016

(54) SIGMA-DELTA ADC WITH INTEGRATED RAW IMAGE SCALING FILTER

(71) Applicant: Sony Corporation, Tokyo (JP)

(72) Inventor: Thomas Richard Ayers, Morgan Hill, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/884,086

(22) Filed: Oct. 15, 2015

(65) Prior Publication Data

US 2016/0093019 A1    Mar. 31, 2016

Related U.S. Application Data

(63) Continuation-in-part of application No. 14/496,878, filed on Sep. 25, 2014.

(51) Int. Cl.
| | |
|---|---|
| *G06K 9/32* | (2006.01) |
| *G06T 3/40* | (2006.01) |
| *H04N 9/04* | (2006.01) |
| *H04N 9/64* | (2006.01) |

(52) U.S. Cl.
CPC .......... *G06T 3/4015* (2013.01); *G06T 3/4023* (2013.01); *G06T 3/4053* (2013.01); *H04N 9/045* (2013.01); *H04N 9/646* (2013.01); *G06T 2207/10016* (2013.01); *G06T 2207/10024* (2013.01)

(58) Field of Classification Search
CPC ... G06T 3/4015; G06T 3/4023; G06T 3/4053; G06T 2207/10016; G06T 2207/10024; H04N 9/045; H04N 9/646

See application file for complete search history.

(56) References Cited

U.S. PATENT DOCUMENTS

| | | | |
|---|---|---|---|
| 2008/0143860 A1* | 6/2008 | Sato | H04N 5/335 348/301 |
| 2009/0016698 A1* | 1/2009 | Oyaizu | H04N 9/8042 386/357 |
| 2011/0261217 A1* | 10/2011 | Muukki | G06T 3/4015 348/222.1 |
| 2012/0050567 A1* | 3/2012 | Cote | H04N 9/68 348/224.1 |
| 2012/0218445 A1* | 8/2012 | Petilli | H04N 5/378 348/241 |
| 2013/0229531 A1* | 9/2013 | Zhang | H04N 17/002 348/187 |

* cited by examiner

*Primary Examiner* — Phuoc Tran

(74) *Attorney, Agent, or Firm* — Michael Best & Friedrich LLP

(57) ABSTRACT

A system and method of processing raw image pixel information includes an integrated decimation filter and raw image scaling filter for a set of M columns of raw image pixel information. The decimation filter operates in the time domain; for example, to calculate a weighted average of time samples. The raw image scaling filter operates in the spatial domain; for example, to calculate a weighted average of spatial samples. The raw image pixel information is modulated by a sigma-delta analog-to-digital modulator. The system and method scale the raw image pixel information by a factor of 1/N. M and N are positive integers.

20 Claims, 18 Drawing Sheets

R

| 13 | 0 | 13 | 0 | 3 | 0 |
|---|---|---|---|---|---|
| 0 | 0 | 0 | 0 | 0 | 0 |
| 13 | 0 | 13 | 0 | 2 | 0 |
| 0 | 0 | 0 | 0 | 0 | 0 |
| 3 | 0 | 2 | 0 | 2 | 0 |
| 0 | 0 | 0 | 0 | 0 | 0 |

$\frac{1}{64} \times$

G1

| 0 | 3 | 0 | 13 | 0 | 13 |
|---|---|---|---|---|---|
| 0 | 0 | 0 | 0 | 0 | 0 |
| 0 | 2 | 0 | 13 | 0 | 13 |
| 0 | 0 | 0 | 0 | 0 | 0 |
| 0 | 2 | 0 | 2 | 0 | 3 |
| 0 | 0 | 0 | 0 | 0 | 0 |

$\frac{1}{64} \times$

G2

| 0 | 0 | 0 | 0 | 0 | 0 |
|---|---|---|---|---|---|
| 3 | 0 | 2 | 0 | 2 | 0 |
| 0 | 0 | 0 | 0 | 0 | 0 |
| 13 | 0 | 13 | 0 | 2 | 0 |
| 0 | 0 | 0 | 0 | 0 | 0 |
| 13 | 0 | 13 | 0 | 3 | 0 |

$\frac{1}{64} \times$

B

| 0 | 0 | 0 | 0 | 0 | 0 |
|---|---|---|---|---|---|
| 0 | 2 | 0 | 2 | 0 | 3 |
| 0 | 0 | 0 | 0 | 0 | 0 |
| 0 | 2 | 0 | 13 | 0 | 13 |
| 0 | 0 | 0 | 0 | 0 | 0 |
| 0 | 3 | 0 | 13 | 0 | 13 |

$\frac{1}{64} \times$

FIG. 9

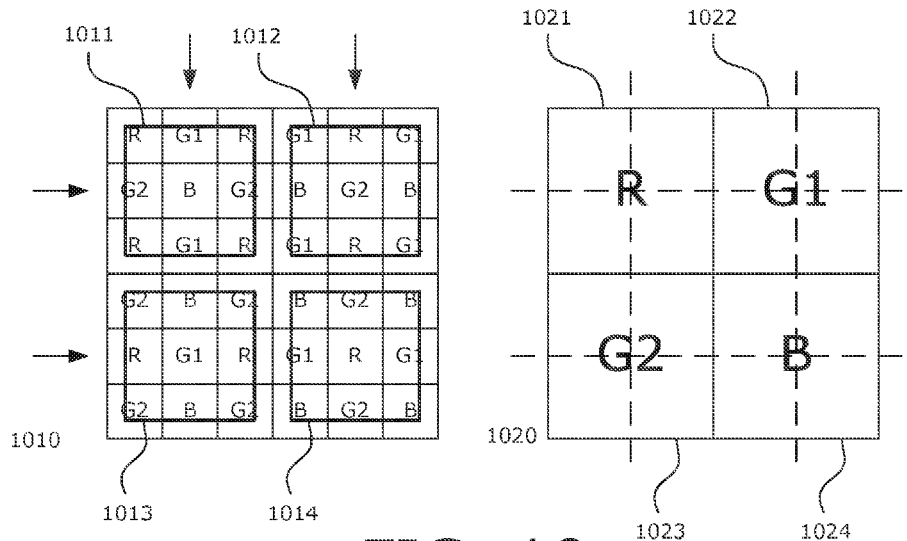
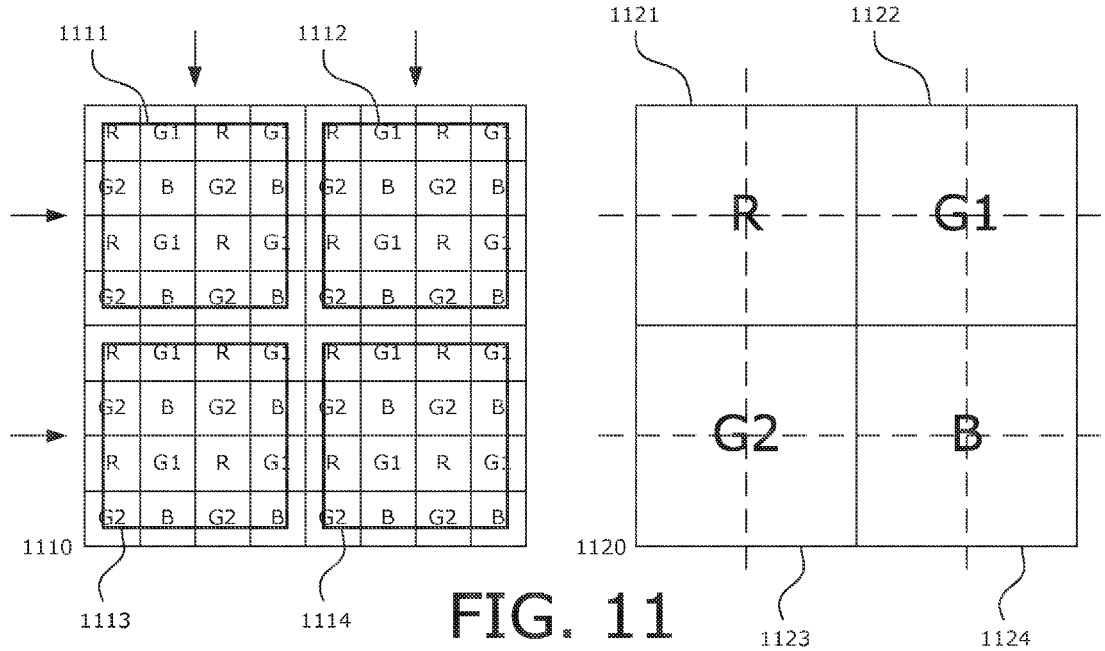
FIG. 10
FIG. 11

| Row | Phase | Filter Weight | ADC0 | | | ADC1 | | |
|---|---|---|---|---|---|---|---|---|
| | | | Col 0 | Col 2 | Col 4 | Col 6 | Col 8 | Col 10 |
| 0 | 0 | 8 | $R(0,0) \to$ $\{r(0,0,0), ..., r(0,0,\beta-1)\}$ | | | | | |
| 0 | 1 | 3 | | $R(0,2) \to$ $\{r(0,2,0), ..., r(0,2,\beta-1)\}$ | | | | |
| Store Partial Sums / Reset All Accumulators | | | | | | | | |
| 0 | 2 | 8 | | | $R(0,4) \to$ $\{r(0,4,0), ..., r(0,4,\beta-1)\}$ | | | |
| 0 | 3 | 3 | | | | $R(0,6) \to$ $\{r(0,6,0), ..., r(0,6,\beta-1)\}$ | | |
| Store Partial Sums / Reset All Accumulators | | | | | | | | |
| 2 | 0 | 3 | $R(2,0) \to$ $\{r(2,0,0), ..., r(2,0,\beta-1)\}$ | | | | | |
| 2 | 1 | 2 | | $R(2,2) \to$ $\{r(2,2,0), ..., r(2,2,\beta-1)\}$ | | | | |
| Generate Output / Reset All Accumulators | | | | | | | | |
| 2 | 2 | 3 | | | $R(2,4) \to$ $\{r(2,4,0), ..., r(2,4,\beta-1)\}$ | | | |
| 2 | 3 | 2 | | | | $R(2,6) \to$ $\{r(2,6,0), ..., r(2,6,\beta-1)\}$ | | |
| Generate Output / Reset All Accumulators | | | | | | | | |

Additional entries shown in the upper portion of the table:
- Col 8, Row 0 Phase 0: $R(0,8) \to \{r(0,8,0), ..., r(0,8,\beta-1)\}$
- Col 10, Row 0 Phase 1: $R(0,10) \to \{r(0,10,0), ..., r(0,10,\beta-1)\}$
- Col 8, Row 2 Phase 1: $R(2,8) \to \{r(2,8,0), ..., r(2,8,\beta-1)\}$
- Col 10, Row 2 Phase 0: $R(2,10) \to \{r(2,10,0), ..., r(2,10,\beta-1)\}$

| Row | Phase | Filter Weight | ADC0 | | | ADC1 | | |
|---|---|---|---|---|---|---|---|---|
| | | | Col 0 | Col 2 | Col 4 | Col 6 | Col 8 | Col 10 |
| | Reset All Accumulators | | | | | | | |
| 3 | 0 | 8 | G2(3,0) → {g2(3,0,0),...,g2(3,0,B-1)} | | | | | |
| 3 | 1 | 3 | | G2(3,2) → {g2(3,2,0),...,g2(3,2,B-1)} | | | | G2(3,10) → {g2(3,10,0),...,g2(3,10,B-1)} |
| | Store Partial Sums / Reset All Accumulators | | | | | | | |
| 3 | 2 | 8 | | | G2(3,4) → {g2(3,4,0),...,g2(3,4,B-1)} | | G2(3,8) → {g2(3,8,0),...,g2(3,8,B-1)} | |
| 3 | 3 | 3 | | | | G2(3,6) → {g2(3,6,0),...,g2(3,6,B-1)} | | |
| | Store Partial Sums / Reset All Accumulators | | | | | | | |
| 1 | 0 | 3 | G2(1,0) → {g2(1,0,0),...,g2(1,0,B-1)} | | | | | |
| 1 | 1 | 2 | | G2(1,2) → {g2(1,2,0),...,g2(1,2,B-1)} | | | G2(1,8) → {g2(1,8,0),...,g2(1,8,B-1)} | |
| | Generate Output / Reset All Accumulators | | | | | | | |
| 1 | 2 | 3 | | | G2(1,4) → {g1(1,4,0),...,g1(1,4,B-1)} | | | |
| 1 | 3 | 2 | | | | G2(1,6) → {g2(1,6,0),...,g2(1,6,B-1)} | | G2(1,10) → {g2(1,10,0),...,g2(1,10,B-1)} |
| | Generate Output / Reset All Accumulators | | | | | | | |

| Row | Phase | Filter Weight | ADC0 | | | | ADC1 | |
|---|---|---|---|---|---|---|---|---|
| | | | Col 1 | Col 3 | Col 5 | Col 7 | Col 9 | Col 11 |
| Reset All Accumulators | | | | | | | | |
| 0 | 0 | 8 | | G1(0,3) → {g1(0,3,0),...,g1(0,3,β-1)} | | | | G1(0,11) → {g1(0,11,0),...,g1(0,11,β-1)} |
| 0 | 1 | 3 | G1(0,1) → {g1(0,1,0),...,g1(0,1,β-1)} | | | | | |
| Store Partial Sums / Reset All Accumulators | | | | | | | | |
| 0 | 2 | 8 | | | G1(0,5) → {g1(0,5,0),...,g1(0,5,β-1)} | | G1(0,9) → {g1(0,9,0),...,g1(0,9,β-1)} | |
| 0 | 3 | 3 | | | | G1(0,7) → {g1(0,7,0),...,g1(0,7,β-1)} | | |
| Store Partial Sums / Reset All Accumulators | | | | | | | | |
| 2 | 0 | 3 | | G1(2,3) → {g1(2,3,0),...,g1(2,3,β-1)} | | | | G1(2,11) → {g1(2,11,0),...,g1(2,11,β-1)} |
| 2 | 1 | 2 | G1(2,1) → {g1(2,1,0),...,g1(2,1,β-1)} | | | | | |
| Generate Output / Reset All Accumulators | | | | | | | | |
| 2 | 2 | 3 | | | G1(2,5) → {g1(2,5,0),...,g1(2,5,β-1)} | | G1(2,9) → {g1(2,9,0),...,g1(2,9,β-1)} | |
| 2 | 3 | 2 | | | | G1(2,7) → {g1(2,7,0),...,g1(2,7,β-1)} | | |
| Generate Output / Reset All Accumulators | | | | | | | | |

| Row | Phase | Filter Weight | Col 1 | Col 3 | Col 5 | Col 7 | Col 9 | Col 11 |
|---|---|---|---|---|---|---|---|---|
| | | | | ADC0 | | | ADC1 | |
| Reset All Accumulators | | | | | | | | |
| 3 | 0 | 8 | | $B(3,3) \rightarrow$ $\{b(3,3,0),...,$ $b(3,3,\beta-1)\}$ | | | | $B(3,11) \rightarrow$ $\{b(3,11,0),...,$ $b(3,11,\beta-1)\}$ |
| 3 | 1 | 3 | $B(3,1) \rightarrow$ $\{b(3,1,0),...,$ $b(3,1,\beta-1)\}$ | | | | | |
| Store Partial Sums / Reset All Accumulators | | | | | | | | |
| 3 | 2 | 8 | | | $B(3,5) \rightarrow$ $\{b(3,5,0),...,$ $b(3,5,\beta-1)\}$ | | $B(3,9) \rightarrow$ $\{b(3,9,0),...,$ $b(3,9,\beta-1)\}$ | |
| 3 | 3 | 3 | | | | $B(3,7) \rightarrow$ $\{b(3,7,0),...,$ $b(3,7,\beta-1)\}$ | | |
| Store Partial Sums / Reset All Accumulators | | | | | | | | |
| 1 | 0 | 3 | | $B(1,3) \rightarrow$ $\{b(1,3,0),...,$ $b(1,3,\beta-1)\}$ | | | | |
| 1 | 1 | 2 | $B(1,1) \rightarrow$ $\{b(1,1,0),...,$ $b(1,1,\beta-1)\}$ | | | | | |
| Generate Output / Reset All Accumulators | | | | | | | | |
| 1 | 2 | 3 | | | $B(1,5) \rightarrow$ $\{b(1,5,0),...,$ $b(1,5,\beta-1)\}$ | | $B(1,9) \rightarrow$ $\{b(1,9,0),...,$ $b(1,9,\beta-1)\}$ | |
| 1 | 3 | 2 | | | | $B(1,7) \rightarrow$ $\{b(1,7,0),...,$ $b(1,7,\beta-1)\}$ | | $B(1,11) \rightarrow$ $\{b(1,11,0),...,$ $b(1,11,\beta-1)\}$ |
| Generate Output / Reset All Accumulators | | | | | | | | |

$\frac{1}{4} \times$ 
| | R | | |
|---|---|---|---|
| 1 | 0 | 1 | 0 |
| 0 | 0 | 0 | 0 |
| 1 | 0 | 1 | 0 |
| 0 | 0 | 0 | 0 |

$\frac{1}{32} \times$
| | R | | |
|---|---|---|---|
| 9 | 0 | 9 | 0 |
| 0 | 0 | 0 | 0 |
| 7 | 0 | 7 | 0 |
| 0 | 0 | 0 | 0 |

FIG. 20

| Row | Phase | Filter Weight | ADC0 | | | | ADC1 | | | |
|---|---|---|---|---|---|---|---|---|---|---|
| | | | Col 0 | Col 2 | Col 4 | Col 6 | Col 6 | Col 8 | Col 10 | |
| 0 | | Reset All Accumulators | | | | | | | | |
| 0 | 0 | 9 | R(0,0) → {r(0,0,0),…, r(0,0,B-1)} | | | | | | | |
| 0 | 1 | 9 | | R(0,2) → {r(0,2,0),…, r(0,2,B-1)} | | | | | | |
| 0 | 2 | 9 | Store Partial Sum / Reset Accumulator | | R(0,4) → {r(0,4,0),…, r(0,4,B-1)} | | | | | |
| | | | | Store Partial Sum / Reset Accumulator | | R(0,6) → {r(0,6,0),…, r(0,6,B-1)} | | | | |
| | | | | | Store Partial Sum / Reset Accumulator | | | R(0,8) → {r(0,8,0),…, r(0,8,B-1)} | | |
| | | | | | | Store Partial Sum / Reset Accumulator | | | R(0,10) → {r(0,10,0),…, r(0,10,B-1)} | |
| 2 | 0 | 7 | R(2,0) → {r(2,0,0),…, r(2,0,B-1)} | | | | | | | |
| 2 | 1 | 7 | | R(2,2) → {r(2,2,0),…, r(2,2,B-1)} | | | | | | |
| 2 | 2 | 7 | Generate Output / Reset Accumulator | | R(2,4) → {r(2,4,0),…, r(2,4,B-1)} | | | | | |
| | | | | Generate Output / Reset Accumulator | | R(2,6) → {r(2,6,0),…, r(2,6,B-1)} | | | | |
| | | | | | Generate Output / Reset Accumulator | | | R(2,8) → {r(2,8,0),…, r(2,8,B-1)} | | |
| | | | | | | Generate Output / Reset Accumulator | | | R(2,10) → {r(2,10,0),…, r(2,10,B-1)} | |

FIG. 21

| Row | Filter Weight | Col 0, ADC 0 | Col 3, ADC 3 | Col 2, ADC 2 | Col 1, ADC 1 | Filter Weight |
|---|---|---|---|---|---|---|
| 0 | 8 | R(0,0) → {r(0,0,0), ..., r(0,0,B-1)} | G1(0,3) → {g1(0,3,0), ..., g1(0,3,B-1)} | R(0,2) → {r(0,2,0), ..., r(0,2,B-1)} | R(0,1) → {r(0,1,0), ..., r(0,1,B-1)} | 3 |
| 2 | 3 | R(2,0) → {r(2,0,0), ..., r(2,0,B-1)} | G1(2,3) → {g1(2,3,0), ..., g1(2,3,B-1)} | R(2,2) → {r(2,2,0), ..., r(2,2,B-1)} | R(2,1) → {r(2,1,0), ..., r(2,1,B-1)} | 2 |
|  |  | Reset All Accumulators | | | | |
| 1 | 3 | G2(1,0) → {g2(1,0,0), ..., g2(1,0,B-1)} | B(1,3) → {B(1,3,0), ..., B(1,3,B-1)} | G2(1,2) → {g2(1,2,0), ..., g2(1,2,B-1)} | R(1,1) → {r(1,1,0), ..., r(1,1,B-1)} | 2 |
| 3 | 8 | G2(3,0) → {g2(3,0,0), ..., g2(3,0,B-1)} | B(3,3) → {B(3,3,0), ..., B(3,3,B-1)} | G2(3,2) → {g2(3,2,0), ..., g2(3,2,B-1)} | R(3,1) → {r(3,1,0), ..., r(3,1,B-1)} | 3 |
|  |  | Generate Output / Reset All Accumulators | | | | |
|  |  | Generate Output / Reset All Accumulators | | | | |

FIG. 22

SIGMA-DELTA ADC WITH INTEGRATED RAW IMAGE SCALING FILTER

CROSS-REFERENCE TO RELATED APPLICATIONS

This application is a continuation-in-part of U.S. patent application Ser. No. 14/496,878, filed Sep. 25, 2014, entitled "Sigma-Delta ADC with Integrated Raw Image Scaling Filter," the entire contents of which are incorporated herein by reference.

BACKGROUND OF THE INVENTION

1. Field of the Invention

This application relates generally to digital image scaling. More specifically, this application relates to a raw domain image scaling system and method that provides flexible implementation of multiple scaling factors.

2. Description of Related Art

In a digital image capturing system, it is common that the resolution requirement for still image capture is higher than that of video output. In such a case, a high-resolution camera capable of supporting the resolution requirement of still image capture is often used. When the camera is used in video mode to produce a video output stream, the data is scaled down to suit the resolution of the video output. For example, a particular image sensor with 8 million pixels (megapixels or MP) can give 8 MP still images. For the same image sensor in video mode, a resolution of 1080×1920 pixels, or approximately 2 MP, may suffice to produce 1080p high-definition (HD) video. Therefore, in 1080p video mode, the image data is scaled down 3× both vertically and horizontally to provide the desired output resolution.

This scaling may be performed either in the raw domain or the RGB domain. An advantage of scaling the image data in the raw domain to the desired video resolution is that it reduces the number of pixels that must be processed through the system. As a result, a majority of processing blocks in an image pipeline or post-processing section can be operated at a lower clock rate than the clock rate required to support full-resolution processing. Operating the processing section at a lower clock rate has significant advantages in reducing electromagnetic interference and reducing power consumption of the system. These advantages are especially valuable in such applications as mobile imaging.

The raw scaling step can be interpreted as a filtering procedure which calculates a weighted average of selected input raw pixels to produce the values of the output raw pixels. The weights used and the pixels selected in the weighted averaging has a large impact on the quality of the output image. To optimize the quality of the output images, a raw domain image scaling method called a "Bayer-consistent raw scaling" (BCRS) method may be used.

When BCRS or another raw domain image scaling method is implemented in an image sensor, it is necessary to incorporate additional circuits, either in the analog domain or in the digital domain (or both), to generate the scaled raw pixels. As a result, it can become necessary to increase the size of the circuit inside the sensor and increase the power consumption of the sensor.

Accordingly, there is a need to incorporate BCRS or another raw domain image scaling method in the sensor in a manner so as to optimize the quality, and match the resolution of the sensor and display, without resulting in a significant increase in circuit complexity and power consumption.

In a structure wherein the raw image scaling filter (RISF) is integrated with a decimation filter of a sigma-delta ADC (an "ADC filter" or "ADCF"), efficient and low power implementation in imaging systems may be achieved. However, such a structure requires that the ADC column sharing structure either match the scaling factor, or be an integer multiple thereof. That is, the scaling factor (e.g. 1/3 X) should match that of the hardware (e.g. three-column sharing structure), or is related to the hardware architecture (e.g. 6-column sharing structure) by an integer multiplier. While such a design is useful for systems that use a fixed scaling factor (e.g. an 18 MP image sensor downscaled by 1/3 X to support 1080P video), the implementation is restrictive in systems where multiple scaling factors need to be supported, or in cases where column sharing is selected for other reasons (e.g. frame rate) that end up being not an integer multiple of the scaling factor. Thus, there is a need to incorporate raw scaling in the sensor in a manner that provides the flexibility to support multiple scaling factors, in addition to the above needs.

BRIEF SUMMARY OF THE INVENTION

Various aspects of the present disclosure relate to a system and method for processing raw image pixel information. The system and method respectively include an integrated decimation filter and raw image scaling filter. The decimation filter operates in the time domain; for example, to calculate a weighted average of time samples. The raw image scaling filter operates in the spatial domain; for example, to calculate a weighted average of spatial samples. The raw image pixel information is modulated by a sigma-delta analog-to-digital modulator.

In this manner, various aspects of the present disclosure provide for improvements in at least the underlying technical processes of image capturing and image processing.

This disclosure can be embodied in various forms, including business processes, computer-implemented methods, computer program products, computer systems and networks, user interfaces, application programming interfaces, hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIG. 9 illustrates an exemplary set of (1/3)X optimized filter coefficient arrays for use with various aspects of the present disclosure.

FIG. 10 illustrates an exemplary (1/3)X scaling operation according to various aspects of the present disclosure.

FIG. 11 illustrates an exemplary (1/4)X scaling operation according to various aspects of the present disclosure.

FIG. 14 illustrates an exemplary set of (1/2)X filter coefficient arrays for use with various aspects of the present disclosure.

FIG. 15 illustrates an exemplary (1/2)X scaling operation according to various aspects of the present disclosure.

FIG. 16 illustrates an exemplary schedule of an integrated RISF/ADCF for calculating an output R pixel value according to various aspects of the present disclosure.

FIG. 17 illustrates an exemplary schedule of an integrated RISF/ADCF for calculating an output G2 pixel value according to various aspects of the present disclosure.

FIG. 18 illustrates an exemplary schedule of an integrated RISF/ADCF for calculating an output G1 pixel value according to various aspects of the present disclosure.

FIG. 19 illustrates an exemplary schedule of an integrated RISF/ADCF for calculating an output B pixel value according to various aspects of the present disclosure.

FIG. 20 illustrates exemplary filter coefficients for a three-phase implementation according to various aspects of the present disclosure.

FIG. 21 illustrates an exemplary schedule of an integrated RISF/ADCF for calculating an output R pixel value using the implementation of FIG. 20.

FIG. 22 illustrates an exemplary schedule for a calculation of the output pixels for a column ADC structure according to various aspects of the present disclosure.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

[Imaging System]

Figure 1:
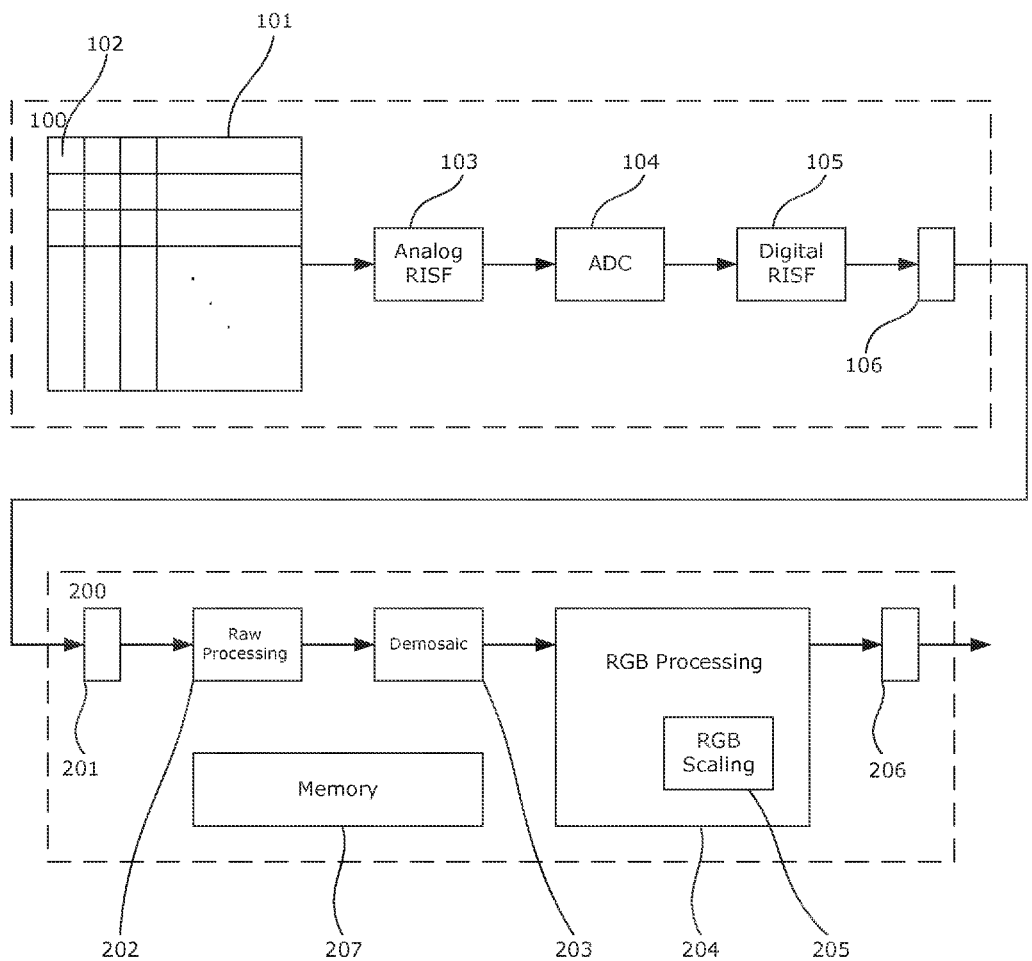
FIG. 1 illustrates an exemplary block diagram of an image sensor according to various aspects of the present disclosure.

FIG. 1 illustrates an exemplary block diagram of an imaging system comprising an image sensor 100 and an image signal processor (ISP) 200.

Image sensor 100 includes a pixel array 101, including a plurality of pixels 102 arranged in rows and columns. Individual pixels 102 include pixel elements such as a photosensitive element (for example, a photodiode) and associated control circuits (for example, transistors). Image sensor 100 further includes an analog raw scaling circuit 103; one or more analog-to-digital converters (ADCs) 104, which convert the pixel data values into digital form; a digital raw scaling circuit 105; and an output buffer 106.

ISP 200 includes an input buffer 201; a raw domain processing circuit 202; a demosaic circuit 203; one or more RGB domain processing circuits 204, including an RGB scaling circuit 205; and an output buffer 206. Various circuits within ISP 200 are operatively connected to a memory buffer 207.

While the imaging system as particularly illustrated includes multiple image scaling blocks, it should be understood that some of these scaling blocks may be omitted; for example, RGB scaling circuit 205 may only be necessary where image scaling is performed in the RGB domain after demosaicing. Depending on the specific implementation in a practical imaging system, only raw domain scaling or only RGB domain scaling may be present, or both may be included. Additionally, the scaling blocks are not limited to the particular order illustrated in FIG. 1; for example, a raw domain scaling block may be included in raw domain processing circuit 202. When multiple scaling blocks are present, the user or system designer will be able to configure the system to select a desired scaling configuration to suit the needs of the system such as frame rate, power consumption, clock speed, and the like.

Various components of the imaging system may be implemented either in hardware, software, or a mixture of both. For hardware implementations, the calculations in the scaling method can be implemented using digital means or analog means. Digital implementations in hardware include application specific integrated circuit (ASIC), field programming logic array (FPGA), other programmable logic circuits, discrete circuit elements, and the like. Analog implementations in hardware can include capacitive or resistive circuit elements such as summing junctions, voltage or current dividers, operation amplifiers, programmable voltage or current sources, and the like. Examples of software implementations include firmware in an embedded chip, software in digital signal processors (DSP), software in a simulator, software in a graphics processing unit (GPU), software in a general purpose central processing unit (CPU), and the like. A mixture of hardware and software may also be used wherein some blocks in the image sensor of FIG. 1 are implemented in hardware, with the remaining blocks implemented in software.

The processing systems and techniques described herein improve the functioning of the image sensor by allowing it to produce output images of high quality with fewer artifacts, using an implementation which requires fewer components and less power.

Figure 2:
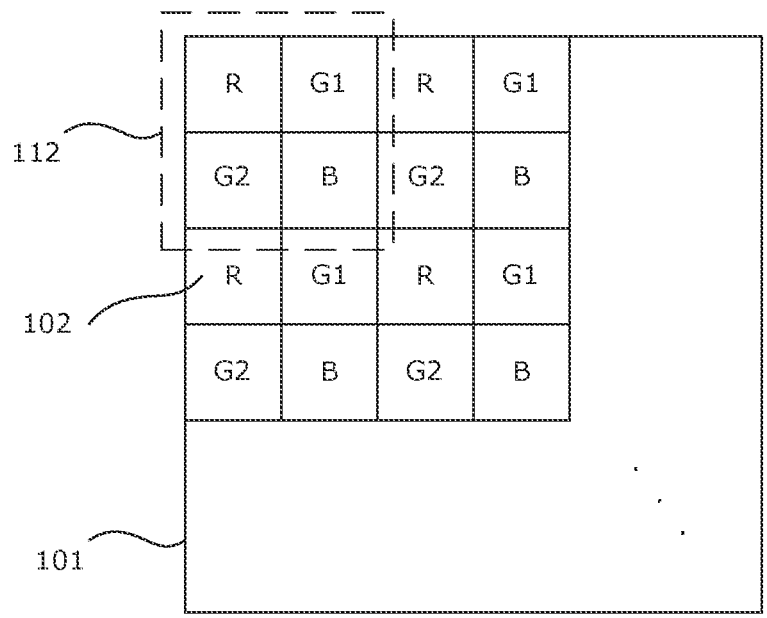
FIG. 2 illustrates an exemplary color filter for use with various aspects of the present disclosure.

To provide for color images, a color filter array (CFA) is provided with image sensor 100, so that each pixel gives a data value corresponding to a single primary color. FIG. 2 illustrates a so-called "Bayer" CFA for use with image sensor 101. In this example, R represents the pixels coated or provided with optical red filters, which therefore give only red pixel values. Similarly, B represents the pixels coated or provided with optical blue filters, which therefore give only blue pixel values. Both G1 and G2 represent pixels coated or provided with green optical filters, which therefore give only green pixel values. Because the green pixels sharing a row with red pixels and the green pixels sharing a row with blue pixels may have different pixel characteristics due to crosstalk and other reasons, they are labeled with the different notations G1 and G2, respectively. While the Bayer CFA illustrated in FIG. 2 uses an RGB layout, the CFA is not particularly limited in this regard. For example, other color arrangements are possible such as red/green/blue/white (RGBW); cyan/magenta/yellow (CMY); cyan/magenta/yellow/green (CMYG); and the like.

In FIG. 2, The RGB Bayer CFA comprises a tiled or repeating arrangement of 2×2 blocks 112 of pixels 102, comprising an R pixel in the upper left corner thereof, a G1 pixel in the upper right corner thereof, a G2 pixel in the lower left corner thereof, and a B pixel in the lower right corner thereof. One of ordinary skill in the art will readily recognize that other orderings are possible, such as B/G2/G1/R, G1/R/B/G2, G2/B/R/G1, and the like, as well as other primary color combinations.

Figure 3:
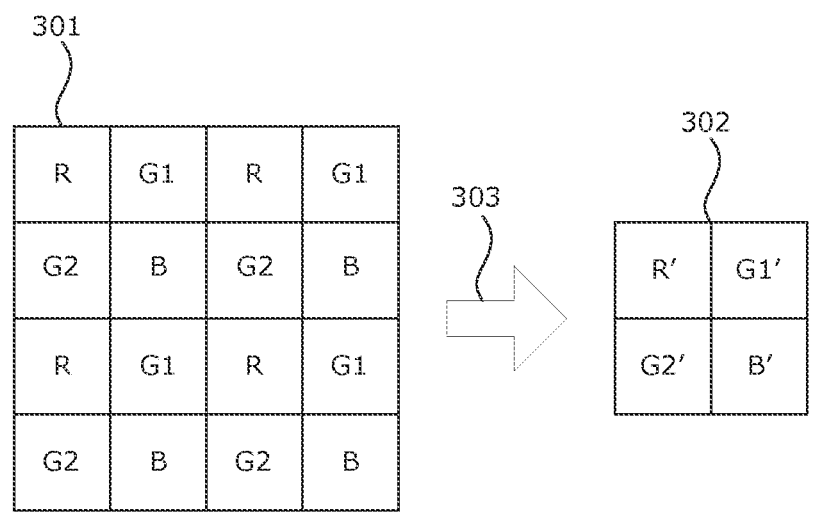
FIG. 3 illustrates an exemplary (1/2)X scaling operation according to various aspects of the present disclosure.

FIG. 3 illustrates a general example of a scaling method where N=2; that is, having a scaling factor of (1/2)X. Here, the output data has a resolution in both the row and column directions which is 1/2 the resolution of the input data. In this example, a Bayer input region of 4×4 is processed to produce a 2×2 Bayer output region. As illustrated in FIG. 3, input raw data 301 is converted into scaled output data 302 by applying a scaling transformation 303, illustrated in more detail with regard to FIG. 8 below.

Figure 4A:
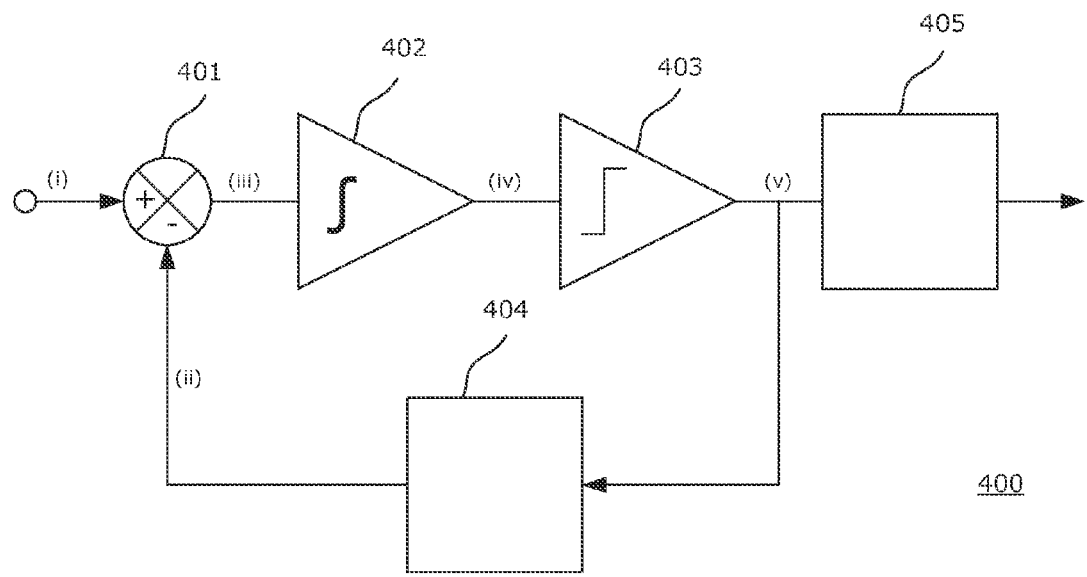
FIGS. 4A and 4B respectively illustrate an exemplary sigma-delta analog-to-digital converter according to various aspects of the present disclosure.

FIG. 4A illustrates an exemplary sigma-delta (also referred to as "delta-sigma," "ΔΣ," or "ΣΔ") ADC 400 for use with an imaging system such as the imaging system described above with regard to FIG. 1. For example, ADC 104 shown in FIG. 1 may be implemented using sigma-delta ADC 400 illustrated in FIG. 4A.

Specifically, FIG. 4A illustrates a first-order sigma-delta modulator 400 in the time domain. Sigma-delta ADC 400 includes a difference circuit 401, an integrator 402, a threshold comparator 403 (for example, a 1-bit ADC), a 1-bit digital-to-analog converter (DAC) 404, and a filter 405. Here, filter 405 is an integrated decimation filter and image scaling filter, where the decimation filter operates in the time domain and the image scaling filter operates in the spatial domain. Sigma-delta ADC 400 may be represented by a sigma-delta modulator, corresponding to elements 401-404, which outputs to filter 405.

Figure 4B:
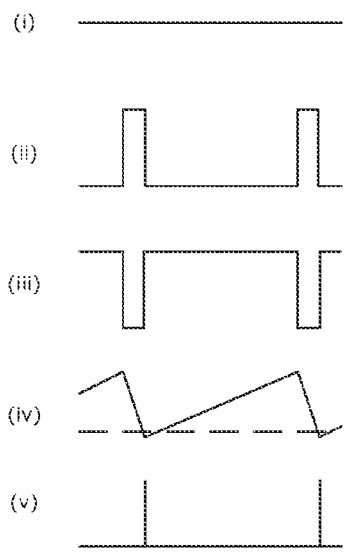

FIG. 4B illustrates an exemplary waveform at points (i)-(v) of FIG. 4A. For ease of explanation, input waveform (i) is illustrated as a constant voltage waveform over the summing interval, although this disclosure is not particularly limited in this manner. Waveform (ii) illustrates a stream of delta impulses output from 1-bit DAC 404. Waveforms (i) and (ii) are input to difference circuit 401, and output as waveform (iii) which is equivalent to (i)-(ii). This difference is integrated in integrator 402 to produce waveform (iv). Waveform (iv) is compared to a threshold or reference voltage (illustrated as a dashed line in FIG. 4B) in threshold comparator 403 to produce waveform (v). Specifically, threshold comparator 403 generates a pulse beginning when waveform (iv) crosses the threshold, and sustains the pulse until waveform (iv) returns across the threshold again.

Figure 5:
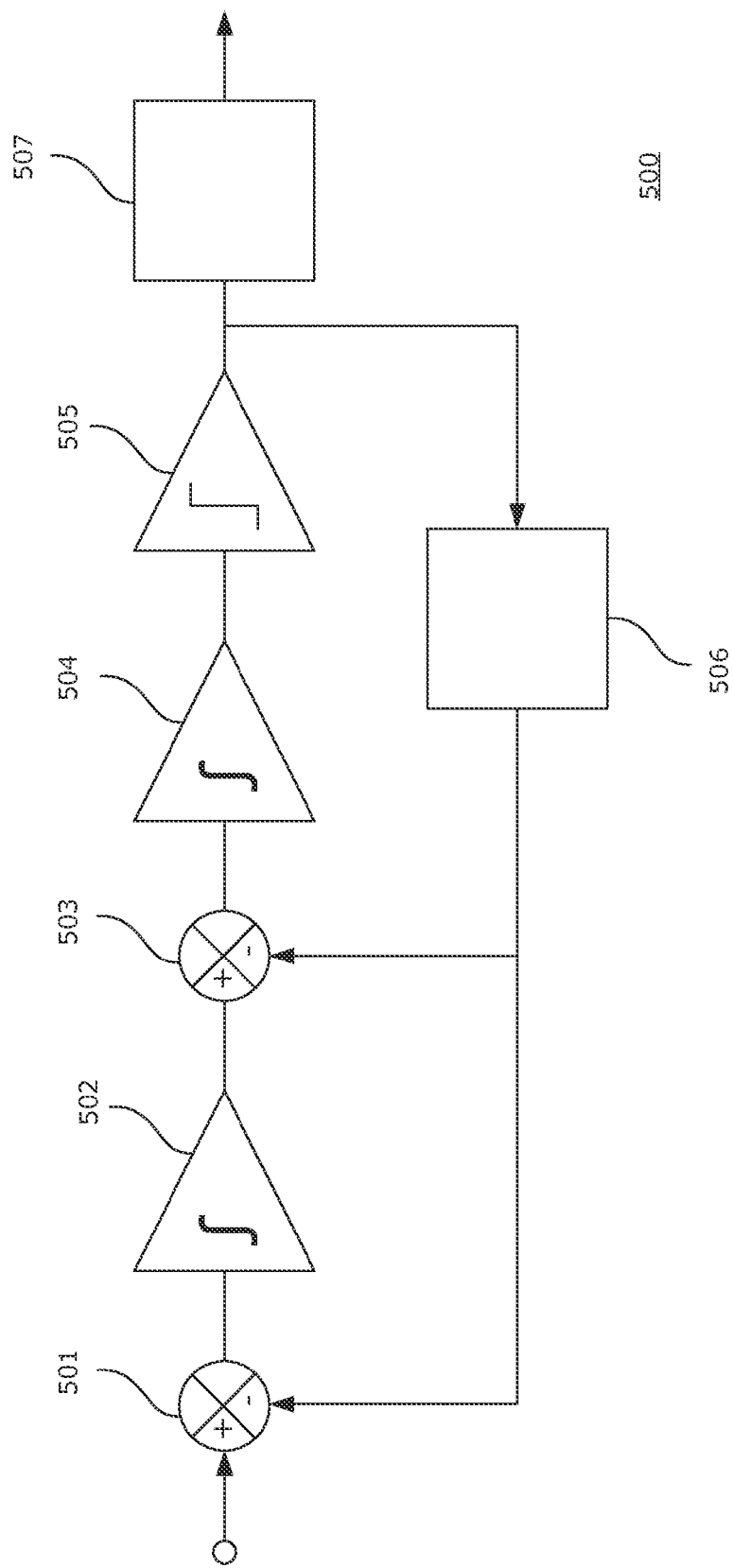
FIG. 5 illustrates another exemplary sigma-delta analog-to-digital converter according to various aspects of the present disclosure.

FIG. 5 illustrates another exemplary sigma-delta ADC 500 for use with an imaging system such as the imaging system described above with regard to FIG. 1. For example, ADC 104 shown in FIG. 1 may be implemented using a sigma-delta ADC 500 illustrated in FIG. 5.

Specifically, FIG. 5 illustrates a second-order sigma-delta modulator 500 in the time domain. Sigma-delta ADC 500 includes a first difference circuit 501, a first integrator 502, a second difference circuit 503, a second integrator 504, a threshold comparator 505, a 1-bit DAC 506, and a filter 507. As above, filter 507 is an integrated decimation filter and image scaling filter, where the decimation filter operates in the time domain and the image scaling filter operates in the spatial domain. Sigma-delta ADC 500 may be represented by a sigma-delta modulator, corresponding to elements 501-506, which outputs to filter 507.

In other words, first-order sigma-delta ADC 400 contains a single differentiator-integrator pair and second-order sigma-delta ADC 500 contains two differentiator-integrator pairs in sequence. This can be extended to higher orders; for example, a third-order sigma-delta ADC will contain three differentiator-integrator pairs in sequence, a fourth-order sigma-delta ADC will contain four differentiator-integrator pairs, and so on.

Figure 6:
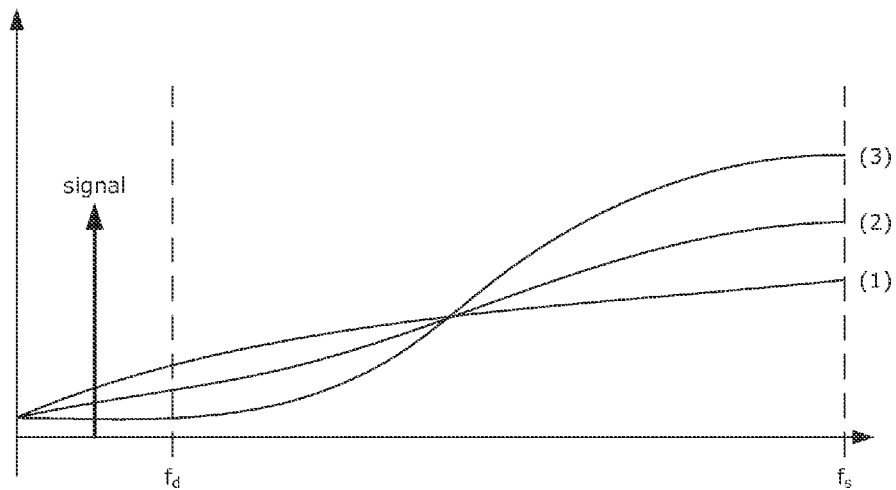
FIG. 6 illustrates several noise-shaping curves for a sigma-delta ADC according to various aspects of the present disclosure.

FIG. 6 illustrates a comparison between noise-shaping curves of different-order sigma-delta modulators. FIG. 6 represents the output corresponding to waveform (v) of FIG. 4A in the frequency domain. In FIG. 6, the vertical arrow represents the signal (that is, the waveform). The dashed line at frequency $f_d$ represents conversion frequency of the decimation filter to which waveform (v) is output. The dashed line at frequency $f_s$ represents the modulator's sampling frequency.

FIG. 6 also shows three noise-shaping curves: curve (1) corresponding to a first-order sigma-delta modulator; curve (2) corresponding to a second-order sigma-delta modulator; and curve (3) corresponding to a third-order sigma-delta modulator. As apparent from FIG. 6, higher-order sigma-delta modulators better confine the noise spectrum to higher frequencies and thus make it easier to filter out this noise.

Figure 7:
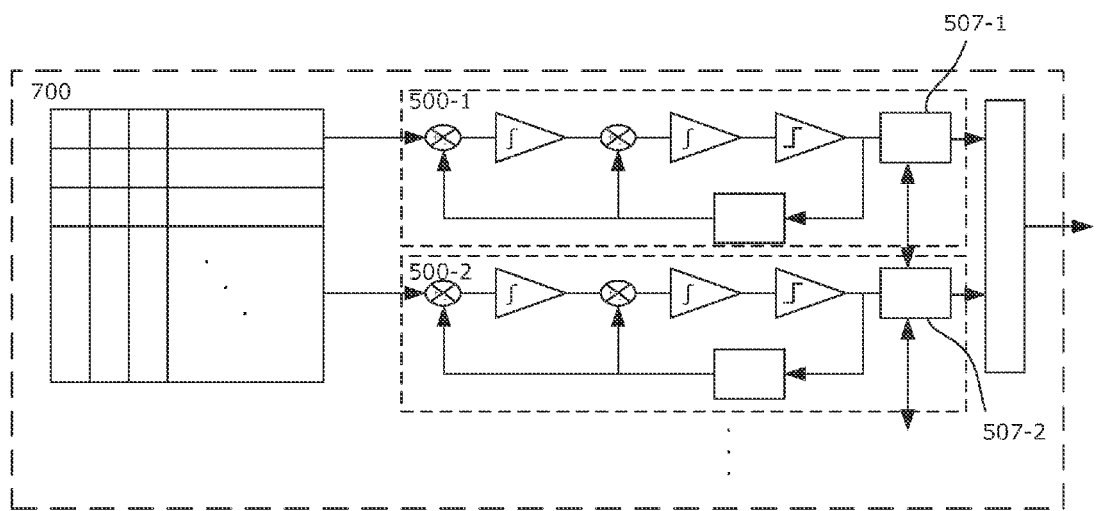
FIG. 7 illustrates an exemplary block diagram of an image sensor according to various aspects of the present disclosure.

FIG. 7 illustrates an exemplary implementation of the ADCs described in FIG. 5. Specifically, FIG. 7 illustrates an image sensor 700 which is similar to image sensor 100 described above, except that elements 103-105 are implemented as a plurality of second-order sigma-delta ADCs 500-1 to 500-n. For clarity of explanation, only two of the n sigma-delta ADCs are explicitly illustrated, 500-1 and 500-2.

In FIG. 7, filters 507-1 to 507-n are illustrated as being downstream from the delta-sigma modulators. In this manner, raw scaling in the digital domain may be performed. Alternatively or additionally, filters may be placed upstream from the delta-sigma modulators so as to perform raw scaling in the analog domain. In implementations where filters are placed both upstream and downstream from the delta-sigma modulators, greater scaling flexibility may be achieved. For example, one can choose to filter either in the analog or digital domain, or may filter particular pixels (for example, filtering in the horizontal direction) in the analog domain and other pixels (for example, filtering in the vertical direction) in the digital domain. For clarity, only filters 507-1 and 507-2 are explicitly illustrated.

As illustrated in FIG. 7, filters 507-1 to 507-n include decimation filters used to calculate the multi-bit output values from the outputs of the corresponding sigma-delta modulators. Specifically, the decimation filters respectively calculate weighted averages of time samples. Filters 507-1 to 507-n also include raw image scaling filter (RISF) circuits, which process the input raw pixels to give output raw pixels at the desired output resolution. Specifically, the RISF circuits calculate weighted averages of spatial samples. During operation, the RISF circuits calculate weighted averages of selected input raw pixels using filter coefficient values (as will be described in more detail below) for raw image scaling to give the output raw pixels. For example, filter coefficient values according to the BCRS method can be used to achieve high output image quality. Moreover, the filters are illustrated as having a data communication path therebetween, illustrated as a double-sided arrow.

[Scaling]

The raw scaling method can be considered a filtering process followed by decimation. Scaling occurs according to a scaling factor (1/N)X both horizontally and vertically, where a Bayer input region of 2N×2N is processed to produce a 2×2 Bayer output region. Scaling can also be performed according to a vertical scaling factor (1/M)X and a horizontal scaling factor (1/N)X, where a Bayer input region of 2M×2N is processed to produce a 2×2 Bayer output region.

Figure 8:
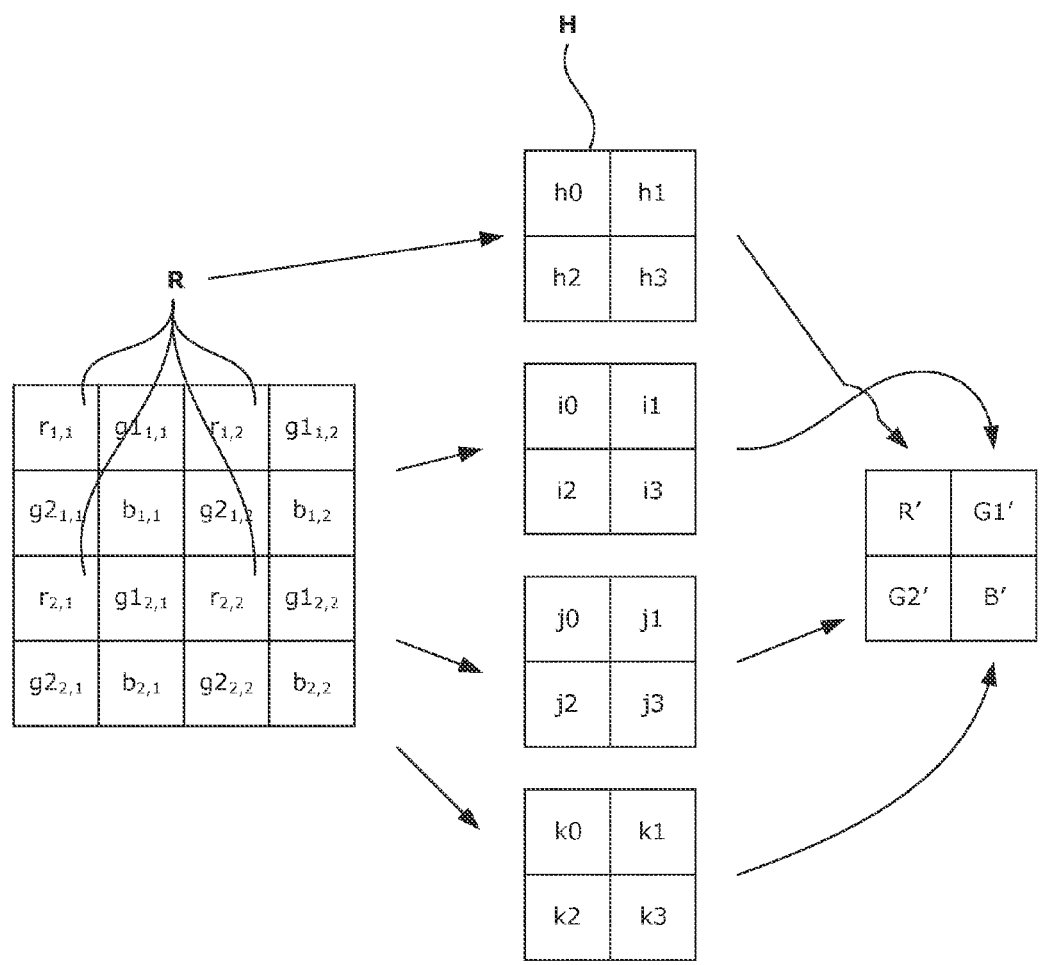
FIG. 8 illustrates an exemplary filtering representation for scaling according to various aspects of the present disclosure.

FIG. 8 illustrates a filtering process where weighted averages of the input raw pixels are calculated as values of the output raw pixels. This is referred to as an RISF filtering as above. Particularly, FIG. 8 illustrates raw image scaling for a scaling factor (1/2)X ; that is, the resolution of the image in both the horizontal and vertical direction are reduced by a factor of 1/2 the resolution of the input data. In the particularly illustrated filtering procedure, the pixel values of each red pixel are considered to be in a red pixel array R defined as $\{r_{1,1}, r_{1,2}, r_{2,1}, r_{2,2}\}$. Red pixel array R is operated on by a red filter coefficient array H defined as $\{h0, h1, h2, h3\}$ to provide an output red pixel R'. Specifically, each element of red pixel array R is multiplied by the corresponding element of red filter coefficient array H. That is, the coefficients in the red filter array are weights to be applied to the corresponding pixel values in the red pixel array. The products are then added together and divided by the sum of all elements of red filter coefficient array H to produce the output red pixel R'. Mathematically, this is represented by the following expression (1):

$$R' = \frac{r_{1,1}h0 + r_{1,2}h1 + r_{2,1}h2 + r_{2,2}h3}{h0 + h1 + h2 + h3} \qquad (1)$$

Similarly, the pixel values of each green pixel in red rows are considered to be in a first green pixel array G1 defined as $\{g1_{1,1}, g1_{1,2}, g1_{2,1}, g1_{2,2}\}$ and are operated on by a first green filter coefficient array I defined as $\{i0, i1, i2, i3\}$ to output first green pixel G1'; the pixel values of each green pixel in blue rows are considered to be in a second green pixel array G2 defined as $\{g2_{1,1}, g2_{1,2}, g2_{2,1}, g2_{2,2}\}$ and are operated on by a second green filter coefficient array J defined as $\{j0, j1, j2, j3\}$ to output second green pixel G2'; and the pixel values of each blue pixel are considered to be in a blue pixel array B defined as $\{b_{1,1}, b_{1,2}, b_{2,1}, b_{2,2}\}$ and are operated on by a blue filter coefficient array K defined as $\{k0, k1, k2, k3\}$ to output blue pixel B'. In this example, four filter weights are used for each color and therefore four input pixels are used to calculate each output pixel value. The region of support (that is, the number and location of pixels used) for the RISF may be changed, and the scaling factor may also be changed.

BCRS utilizes optimized filter coefficients, which are described here. FIG. 9 illustrates an exemplary set of optimized filter coefficient arrays for a scaling factor (1/3)X. The filter coefficients are applied to the raw pixels in the spatial domain. In other words, the respective grids shown in the arrays of FIG. 9 represent the pixel coordinates where each rectangle corresponds to a raw pixel. Other filter weight values may also be used in embodiments of this disclosure.

One of ordinary skill will recognize that raw domain image scaling methods other than BCRS can be used in the current invention to achieve efficient implementations. Changing the raw domain scaling method simply requires changing the numerical values of individual filter weights and/or the regions of support of the filter.

An example of BCRS with a scaling factor of (1/3)X (that is, N=3) is illustrated in FIG. 10. In this case, the input raw image is divided into tiles of size 6×6, and from each 6×6 input tile the scaling method calculates a 2×2 block of the output image. As illustrated, each 6×6 input tile 1010 is divided into four 3×3 sub-tiles 1011-1014 that respectively represent the physical area of virtual pixel 1021-1024 in a block 1020 of a virtual image sensor having a lower resolution equal to the scaled resolution. That is, the virtual image sensor would have 1/3 the resolution both vertically and horizontally compared to the actual image sensor used for capturing the raw image data.

Sub-tiles 1011-1014 are identified by the color of the corresponding virtual pixel 1021-1024, under the assumption that the virtual image sensor uses the same Bayer CFA as the actual image sensor. For example, sub-tile 1011 is identified as an R sub-tile because it corresponds to virtual pixel 1021, which is positioned where the R filter would be in a Bayer CFA on the virtual image sensor. Similarly, sub-tile 1012 is identified as a G1 sub-tile, sub-tile 1013 as a G2 sub-tile, and 1014 as a B sub-tile.

A similar example of BCRS with a scaling factor of (1/4)X is illustrated in FIG. 11. That is, the input raw image is divided into tiles of 8×8, and from each 8×8 input tile the scaling method calculates a 2×2 output block. Here, each 8×8 tile 1110 is divided into four 4×4 sub-tiles 1111-1114 that respectively represent the physical area of a virtual pixel 1121-1124 in a block 1120 of a virtual image sensor having a resolution equal to ¼ the resolution both vertically and horizontally compared to the actual image sensor.

In both FIGS. 10-11, the geometric pixel centers of the virtual pixels 1021-1024 and 1121-1124 are indicated by dashed lines. The corresponding physical locations are indicated by arrows in input tiles 1010 and 1110; these are collocated with the centers of the sub-tiles 1011-1014 and 1111-1114.

Mathematically, the scaling process can be written as a convolution according to the following expression (2):

$$y(m, n, t) = \sum_{k,l} w(m-k, n-l) x(k, l, t) \qquad (2)$$

In this convolution, w(k,l) represents the filter coefficients such as those described above with regard to FIG. 9, x(k,l,t) is the input pixel at location (k,l) at time t, and y(m,n,t) is the output raw pixel at location (m,n) at time t. Both the input and output raw pixel values x(k,l,t) and y(m,n,t) are written with an explicit dependence on time. The RISF is a spatial filter where weighted averages of neighboring pixel values are calculated. The RISF coefficients are not dependent on time (that is, they are constant with respect to time), and hence the time index is not needed in w(k,1).

The preferred filter is a decimation filter for sigma-delta modulation, and is a time domain filter which operates on the output samples from a sigma-delta modulator at an oversampling ratio β. A sinc filter of length β with filter weights equal to a scaled version of the sinc function, which corresponds to a box function in the frequency domain, is frequently used. Mathematically, this is written according to the following expression (3):

$$x(k, l, t) = x(k, l, \beta v) = \sum_{p=-\infty}^{\infty} \operatorname{sinc}\left(\frac{\beta v - p}{\beta}\right) q(k, l, p) \qquad (3)$$

$$\approx \sum_{p=\beta(v-\frac{1}{2})+1}^{\beta(v+\frac{1}{2})} \frac{1}{\beta} \operatorname{sinc}\left(\frac{\beta v - p}{\beta}\right) q(k, l, p)$$

Above, q(k,l,p) is the output sequence from the sigma-delta modulator which are binary samples (either 0 or 1) at β times the Nyquist rate. Since the impulse response of a sinc filter has infinite length, it is frequently truncated in practice as shown in expression (3) above. For convenience in practical implementations, the impulse may be shifted by half a sampling period in the output and therefore may be represented by the following expression (3'):

$$x(k, l, t) = x(k, l, \beta v) \approx \sum_{p=\beta(v-1)+1}^{\beta v} \frac{1}{\beta} \operatorname{sinc}\left(\frac{\beta\left(v - \frac{1}{2}\right) - p}{\beta}\right) q(k, l, p) \quad (3')$$

Either expression (3) or (3') may be used, and the particular choice of expression does not impact the output signal as an accurate representation of the analog input. Other decimation filters are also possible and will be apparent to one skilled in the art.

From the above expressions, the output pixel from the image sensor after image scaling can be written according to the following expression (4):

$$y(m, n, t) = \sum_{k,l} w(m - k, n - l) x(k, l, t) \quad (4)$$

$$= \sum_{k,l} w(m - k, n - l) \sum_{p=\beta(v-1)+1}^{\beta v} \frac{1}{\beta} \operatorname{sinc}\left(\frac{\beta\left(v - \frac{1}{2}\right) - p}{\beta}\right) q(k, l, p)$$

$$= \sum_{k,l} \left[ \sum_{p=\beta(v-1)+1}^{\beta v} w(m - k, n - l) \frac{1}{\beta} \operatorname{sinc}\left(\frac{\beta\left(v - \frac{1}{2}\right) - p}{\beta}\right) \right] q(k, l, p)$$

Above, the term enclosed in square brackets represents the impulse response of the sinc filter scaled by the weights of the raw image scaling filter. FIG. 7 shows an image sensor where the RISF has been integrated into the ADCF. In particular, the integrated ADCF/RISF in FIG. 7 implements the logic to first calculate the following expression (5):

$$s(m, n, p, k, l) = \quad (5)$$

$$\sum_{p=\beta(v-1)+1}^{\beta v} w(m - k, n - l) \frac{1}{\beta} \operatorname{sinc}\left(\frac{\beta\left(v - \frac{1}{2}\right) - p}{\beta}\right) q(k, l, p)$$

For each pixel location in the input image, the integrated ADCF/RISF calculates the output samples using an accumulator that either sums the scaled sinc filter impulse response or skips the accumulation depending on the binary sample $q(k, l, p)$. This step is possible and can be calculated very easily because the samples $q(k,l,p)$ have values equal to either 1 or 0. After the ADCF has completed calculation of the inner summation represented by expression (5), the outer summation in expression (4) indexed by k,l are calculated by the RISF by communicating the partial sums between the accumulators. In a column-based ADC where one ADC is provided for a small number (for example, three) of columns, the pixels flow sequentially into the ADC and hence the summation over k,l can be performed accordingly.

[Implementation]

Image sensors typically use many ADCs in parallel to perform analog-to-digital conversion of many pixels simultaneously, so that high frame rates can be achieved. For example, according to a "column ADC" architecture, one or a plurality of columns of pixels (one-column, two-column sharing, three-column sharing, etc.) are connected to a single ADC. Because the scaling factor is not necessarily the same as the ADC column sharing structure (e.g. scaling by 1/2 X with a three-column sharing ADC structure), the values s(m, n,p,k,l) must be shared or communicated between different ADC structures. As a result, a data communication path is provided between the various ADCF/RISF combinations.

Figure 12:
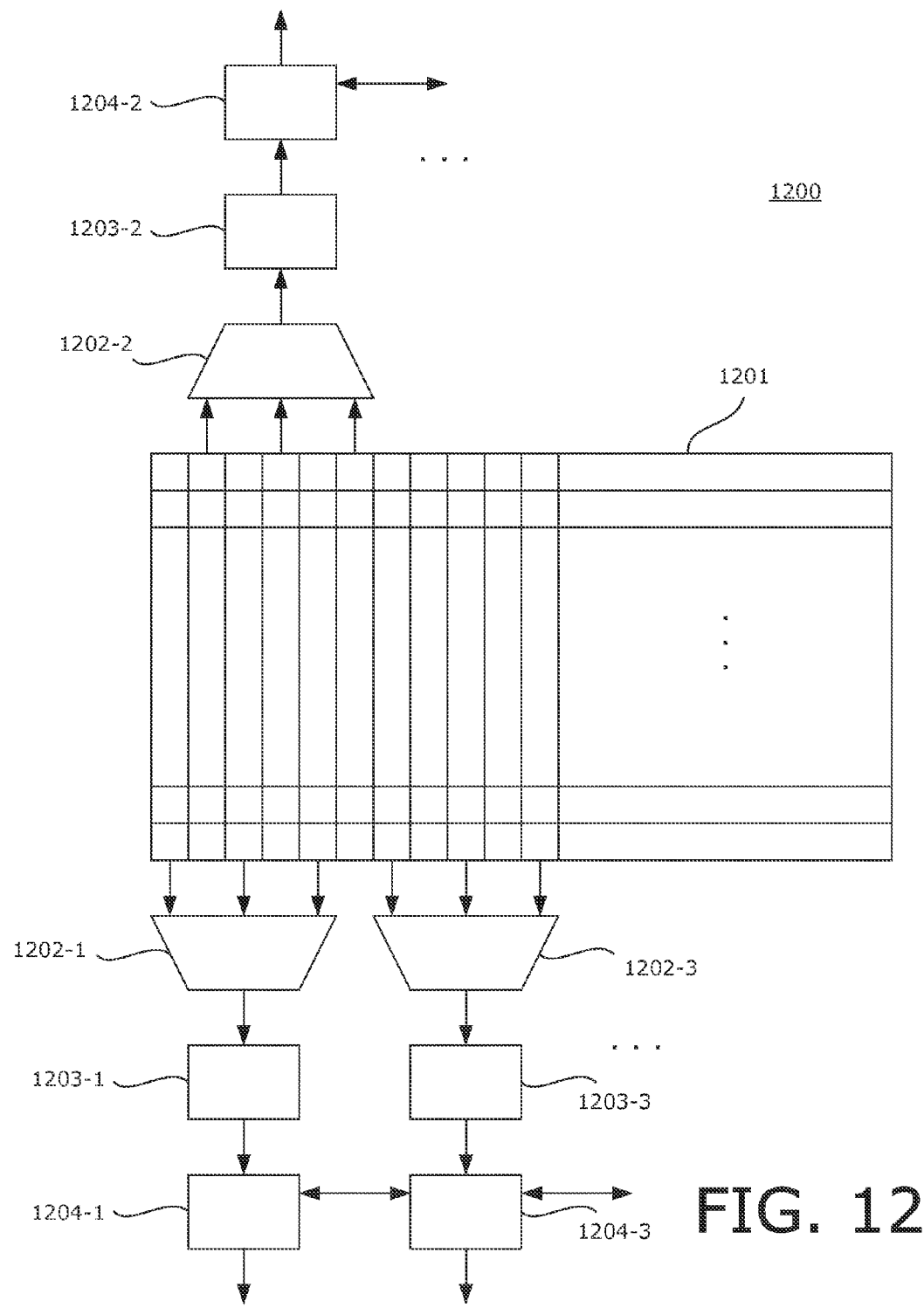
FIG. 12 illustrates an exemplary image sensor with a three-column shared ADC configuration according to various aspects of the present disclosure.

FIG. 12 illustrates an exemplary implementation according to a three-column sharing ADC architecture. Image sensor 1200 includes a pixel array 1201 divided into a plurality of rows and columns. Respective columns are connected to column circuits, of which three are illustrated. Each column includes a multiplexer 1202, a sigma-delta ADC 1203, and a filter 1204. The above-mentioned data communication path is illustrated as a double-sided arrow between adjacent filters (e.g. 1204-1 and 1204-3). Any one of a number of unidirectional or bidirectional buses may be used to carry information from the output of one accumulator to the input of another. With such a data communication in place, the values s(m,n, p,k,l) are down-sampled with respect to p, and then the sum over k and l is calculated to produce the output. To facilitate processing the Bayer structured data as shown in FIG. 2, the first ADC (that is, ADC 1203-1) is arranged such that it is connected to columns 0 (the left-most column), 2, and 4 via multiplexer 1202-1. Similarly, the second ADC (that is, ADC 1203-2) is arranged such that it is connected to columns 1, 3, and 5 via multiplexer 1202-2. The arrangement of ADCs and multiplexers for the entire pixel array is repeated in a similar fashion across the array.

Figure 13:
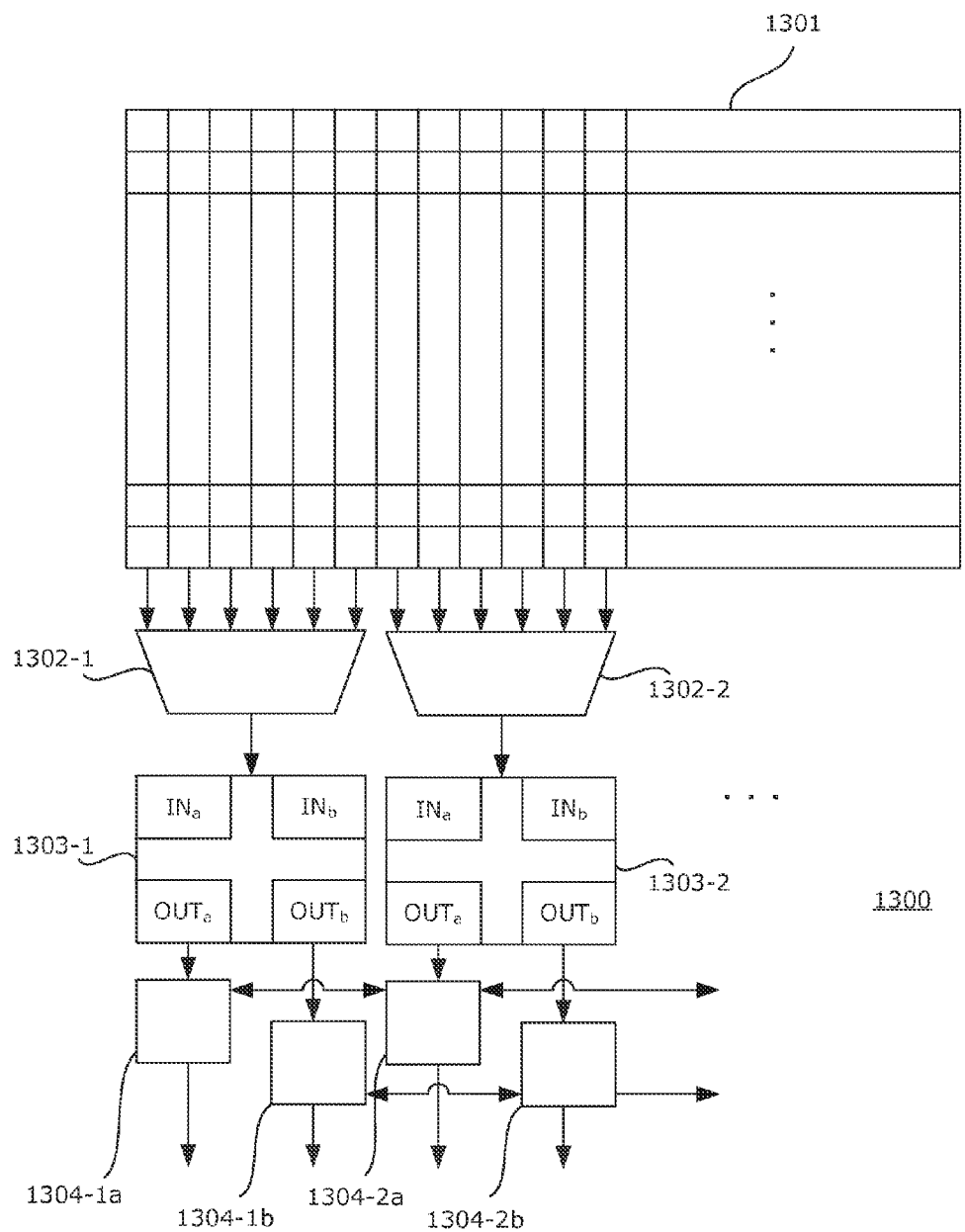
FIG. 13 illustrates an exemplary image sensor with a three-column shared dual-port ADC configuration according to various aspects of the present disclosure.

FIG. 13 illustrates another exemplary implementation using dual-port sigma-delta ADCs. A dual-port sigma-delta ADC is a sigma-delta ADC cell which includes two independent ADCs in a single unit. These are distinguished as Port A and Port B. As illustrated in FIG. 13, image sensor 1300 includes a pixel array 1301 and a plurality of column circuits (of which one is illustrated) comprising, for the illustrated column circuit, a multiplexer 1302-1, a dual-port sigma-delta ADC 1303-1, and a pair of RISF/ADCF filters 1304-1a and 1304-1b. Columns 0-5 are routed into ADC 1303-1 via multiplexer 1302-1, such that the signals from columns 0, 2, and 4 are fed through input port $IN_a$ and columns 1, 3, and 5 are fed through input port $IN_b$. The output from output port $OUT_a$ is connected to integrated RISF/ADCF 1304-1a, whereas the output from output port $OUT_b$ is connected to integrated RISF/ADCF 1304-1b. In a similar manner to the exemplary implementation of FIG. 12, a communication path is provided between each RISF/ADCF and others so that multiple scaling factors are supported.

With the provision of a communication path, an image sensor using an N-column sharing structure may operate at a scaling factor other than (1/N)X; that is, the integer downscaling factor does not need to be the same as the number of ADC columns shared. Generally, implementations using this method are possible for any column sharing structure and any scaling factor as long as there is a data communication path between and among the various ADCs. For example, an image sensor with a three-column sharing structure may operate at a scaling factor (1/2)X.

Figures 14, 15:
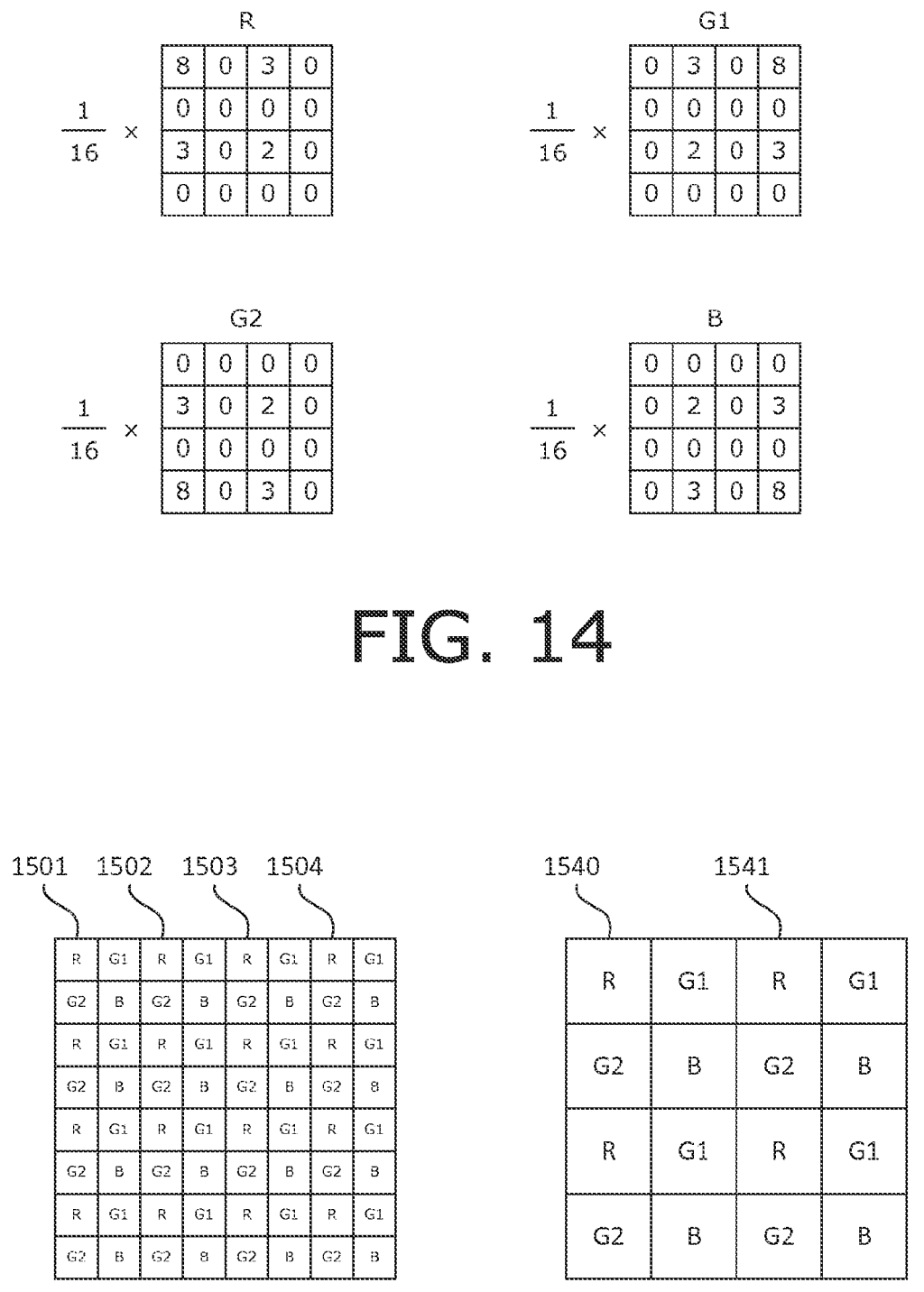

FIG. 14 illustrates an example of filter coefficient sets for a scaling factor (1/2)X, and FIG. 15 illustrates the input and output pixels for such a scaling factor. For clarity, only the R pixels in the first row of the input and output pixels are explicitly labeled. Here, the input R pixels are 1501-1504, and the output pixels are 1540-1541.

FIG. 16 shows the schedule of operation for an integrated RISF/ADCF to produce the first three output red pixels on the first row (for example, output pixels 1540, 1541, and an unlabeled R pixel in the same row of FIG. 15), using the optimized BCRS filter for the scaling factor (1/2)X of FIG. 14. In this example of column sharing structure and scaling factor, the circuit structure operates with four timing phases as illustrated in FIG. 16 where each phase corresponds to a column of pixels to which the ADC is connected. To illustrate the processing steps of FIG. 16, reference is made to FIG. 15.

To calculate the output with an image scaling factor (1/2)X and a three-column sharing architecture, it is useful to communicate the partial sums of various ADCF/RISF structures. Furthermore, the ADCF/RISF within each group of shared columns is made available to calculate independent partial sums s(m,n,p,k,l) of different columns within the group. Different design choices for handling the accumulators and possible sums may be used. In one preferred embodiment, however, the partial sums s(m,n,p,k,l) can be sent for storage outside of the ADCF/RISF, and the final sum over k and l may be performed outside of the ADCF/RISF. In such a case, the accumulators in the ADCF/RISF can be reset and will therefore be ready to be used to calculate s(m,n,p,k,l) for other columns within the column sharing structure. The schedules in FIGS. 16-19 illustrate such a method where partial sums are sent outside of the ADCF/RISF for the final accumulation over k and l.

In another preferred embodiment, however, memory elements may be provided within the ADCF/RISF to store the partial sums. This eliminates sending data in and out of the filters and hence may increase execution speed. Once the partial sums are stored, the accumulators in the ADCF/RISF can be reset and will therefore be ready to be used to calculate s(m,n,p,k,l) for other columns. This may also be accomplished using the same schedules illustrated in FIGS. 16-19.

In the embodiment illustrated in FIGS. 16-19, prior to row 0 phase 0, the accumulators used to store the partial sums are reset. During row 0 phase 0, the sigma-delta ADC ADC0 takes an input from the red pixel 1501 of FIG. 15. This pixel is labeled as R(0,0) in FIG. 16. The sigma-delta modulator, operating at an oversampling ratio $\beta$, generates B binary samples which are labeled as r(0,0,0) to (0,0,$\beta$−1) in FIG. 16. During this time, the filter coefficient with a weight value of 8 is presented by the RISF to an accumulator. In this embodiment, the filter weight is used to scale the decimator filter (sinc or other decimation filter) coefficients. The logic in the filter is arranged such that the filter weight value is accumulated if a binary value r(k,l,m) equals 1, and skipped otherwise. In this case, the accumulator output is calculated as a weighted sum of the scaling filter weight (here, 8) multiplied by the binary output of the sigma delta output and the decimation filter coefficient. For ease of illustration, the decimator coefficients (for example, of the sinc filter) are not shown in the schedules of FIGS. 16-19. It will be understood that they are present and are scaled by the RISF weights.

At the same time (for example, row 0 phase 0), the sigma-delta ADC ADC1 performs similar operations on pixel R(0, 8), generating B binary samples which are labeled as r(0,8,0) to (0,8,$\beta$−1) in FIG. 16. The same filter weight (8) is used in the accumulation which depends on the binary values r(0,8, m).

When this is completed the filter goes to row 0 phase 1 where the red pixel 1502 at row 0 column 2 of FIG. 15 is presented to the sigma-delta ADC ADC0. This is labeled as R(0,2) in FIG. 16. The sigma-delta modulator generates the binary samples labeled as r(0,2,0) to (0,2,$\beta$−1) in FIG. 16. During this period, the filter weight value 3 is presented, which is used with the sinc filter weights in the accumulation of s(m,n,p,k,l) if a binary value r(k,l,m) equals 1 and skipped otherwise. Similarly, the sigma-delta ADC ADC1 generates the binary samples r(0,10,0) to r(0,10,$\beta$-1) from input pixel R(0,10), and accumulation of the scaled filter weights using this binary sequence is performed.

At this point, the partial sums of s(m,n,p,k,l) in the accumulators is stored so that the accumulators are free to be used to calculate the partial sums for other columns. In the preferred embodiment, the partial sums are sent and stored outside of the ADCF/RISF so that the final sum can be performed outside of the structure. As described above, memory elements may instead be provided to store the partial sums so that the entire calculation of the output pixels can be performed within the ADCF/RISF structures. After the partial sums are stored, the accumulators are reset.

In the next clock which corresponds to row 0 phase 2 as shown in FIG. 16, the sigma-delta ADC0 processes pixel R(0,4) in a similar fashion as described above, where the filter weight value for this period equals 8. During this clock, ADC1 is in an idle state and does not process any input pixels. As shown in FIG. 16, the partial sum (accumulation of filter weights according to the binary sequence) for pixel R(0,4) will be added to the partial sum from pixel R(0,6), which will be processed in the next clock. It is necessary to pass the partial sum from ADC0 to ADC1 so that filtering of R(0,4) and R(0,6) is properly calculated. The partial sum for R(0,4) is so passed via a bus or wire connection to ADC1.

At the next clock which is row 0 phase 3, the sigma-delta ADC ADC0 is in an idle state. Sigma-delta ADC ADC1 takes input pixel R(0,6), generates the binary sequence r(0,6,0) to r(0,6,$\beta$−1) shown in FIG. 16, and accumulates using filter weight value 3. For this accumulation, the accumulator is initialized with the partial sum passed from ADC0, as described above, and hence the overall sum after accumulation would be the partial sum from filtering R(0,4) and R(0,6).

At the end of row 0 phase 3, the filter has accumulated partial sums for the output red pixel value. The partial sums are stored either internally or externally, and the accumulators are then reset. At this time, the output R values are not completely determined yet because row 2 has not yet been processed according to the RISF. The next step is determined by the particular image sensor implementation. In a preferred implementation where the image sensor includes a sequencer so that pixel rows can be read out (that is, presented to the ADC) in any arbitrary ordering, the next row to be read will be row 2. In this case, processing for the output red pixel continues with row 2 as shown in FIG. 16, in a similar manner to the process for row 0. A similar step of passing the partial sum from ADC0 to ADC1 after processing R(2,4) and before processing R(2,6) takes place. At the end of row 2 phases 1 and 3, respectively, the sums required by the RISF and ADCF are computed. The sum is then divided by 16 for the RISF (which can be implemented as a right shift operation). After this step, the computed R pixel value is sent to the output, and the accumulator is reset.

Similarly, the first output G2 pixel from FIG. 15 can be computed using a schedule as shown in FIG. 17. In this schedule, the reading out of the rows is arranged in an ordering such that row 3 is read out first, followed by row 1. This is preferred so that the filter weight values can be presented in the same ordering as in FIG. 16. Passing of partial sums from ADC0 to ADC1 is performed after processing pixels G2(3,4) and G2(1,4). Therefore, considering the calculation of the first output R and G2 pixels, the first four rows are read out in this example in the order 0→2→3→1.

The row ordering 0→2→3→1 above is an example where the ordering of presenting the filter coefficients is fixed. Other row orderings can be used; for example, 0→2→1→3. In such a case, the ordering of presenting the filter weights will be changed accordingly.

In a three-column sharing structure, the G1 and B columns use a separate ADC from the R and G2 columns. The output G1 and B pixels are computed by their respective integrated RISF/ADCF in a similar fashion. FIGS. 18 and 19 show an exemplary schedule of the integrated RISF/ADCF for computing the R and G2 pixels. In this example, pixels from column 3 are fed to the sigma-delta module prior to column 1, pixels from column 7 are fed prior to column 5, and so on. This ordering can be controlled by the multiplexers in FIG. 12 or 13. Partial sum passing between ADCs is performed for processing pixels in columns 5, 7, and so on.

In sensor embodiments where rows of pixels must be read out in a top-to-bottom ordering, an integrated RISF/ADCF can be implemented with additional storage and logic elements.

For example, the case of the schedule of FIG. 16 at a point where the partial sum calculations for row 0 phase 3 have been completed is considered. In this case, because row 1 must be read out before row 2, memory elements (either internally or externally) must be provided to store the R, G1, G2, and B partial sums simultaneously. After the R partial sums are stored, the accumulator in each RISF is reset, and the pixels in row 1 are fed to the ADCs. The integrated RISF/ADCF follows the schedule for row 1 phases 0-3 as listed in FIG. 17. After row 1 phase 3, the partial sums for the G2 pixels are stored, one for each two columns. At this point, the stored partial sums for the R pixels are respectively loaded into the corresponding accumulators, and the procedure continues from row 2 phase 0 in FIG. 16. This alternating procedure continues until the end of row 2 phase 3, at which point the value in each accumulator is right-shifted and divided as required by the RISF and ADCF. The resulting R values, one from each RISF/ADCF, are sent to the output. Thereafter, the G2 partial sums are loaded into the accumulators, and the schedule for row 3 in FIG. 19 is followed. After row 3 phase 3, the value in each accumulator is right-shifted and divided according to the RISF and ADCF. The resulting G2 values are sent to the output.

In the embodiment illustrated in FIGS. 16-19, four phases are required for each row to accumulate the appropriate filtering given the set of filter weights in FIG. 14. Alternatively, two coefficient buses can be incorporated to supply the coefficients for column 4 and column 6 in FIGS. 16-19 simultaneously so that the procedure can be completed in three phases. For some filter weights arrays that are more symmetric, the number of phases may be reduced from four to three. FIG. 20 illustrates two examples of filter weight arrays where a three-phase implementation is possible. In these examples, only the weights for R pixels are shown for ease of explanation, and filter weights for other colors may easily be imputed by symmetry. Such an implementation using only three phases has at least the additional advantage that the processing speed of the overall image sensor is increased by 33%. That is, if the time required to read out all the pixels is T in a four-phase readout scheme, the time to read the entire array of pixels is T/0.74 when a three-phase readout scheme is used. FIG. 21 illustrates an exemplary schedule for R pixels indicating that a three-phase implementation is possible using the filter weights of FIG. 20 (here, the set of weights on the right). In this schedule, partial sums for processing pixels in column 6 are passed from ADC1 to ADC0. The corresponding schedules for G2, G1, and B schedules follows in a similar manner to those for FIGS. 17-19.

Operation of the integrated RISF/ADCF is described above for image sensor embodiments with a three-column sharing architecture, for two different types of pixel readout ordering. The method can be extended in a straightforward manner to image sensors with other ADC column sharing structures, other readout orderings, and for other scaling factors, as will be readily recognized in the art.

For example, the method can be extended to image sensors with a one-column sharing structure; that is, a structure where each column is fitted with an independent ADC. FIG. 22 shows such a configuration for a scaling factor of (1/2)X using the scaling filter illustrated in FIG. 14. In this architecture, each ADC operates together at every clock. As a result, an entire row is processed at a single clock, thus maximizing the throughput of the system. FIG. 22 shows four columns of the sensor in operation. Other columns in the sensor can be replicated similarly.

For the purpose of feeding the scaling filter weight, the ADCs are illustrated as being partitioned into two groups as illustrated in FIG. 22. In particular, columns 0 and 3 are in a first group and columns 1 and 2 are in a second group. After the first phase, the partial sums for R(0,0) and G1(0,3) are accumulated using filter weight 8, and the partial sums for R(0,2) are accumulated using filter weight 3. As above, image rows can be read out in any desired sequence. Here, image row 2 is read out next. The partial sums for R(2,0) and G1(2,3) are accumulated using filter weight 3, and the partial sums for R(2,2) and G1(2,1) are accumulated using filter weight 2. Because the accumulators were not reset, the ADCs have the partial sums 8×R(0,0)+3×R(2,0), 8×G1(0,3)+3×G1(2,3), 3×R(0,2)+2×R(2,2), and 3×G1(0,1)+2×G1(2,1), respectively.

Thereafter, in order to calculate the partial sums for R and G1, for example, partial sums are sent from column 0 to column 2, and from column 3 to column 1. This is accomplished by the bus or wire connections between the ADCs of different columns in the manner illustrated above. Once the partial sums are transferred between columns, the sums of the R and G1 pixels are independently accumulated to produce one R and one G1 output pixel within the four columns. After the output pixels are generated, all of the accumulators are reset. The procedure continues similarly for rows 1 and 3 to produce one output G2 pixel and one output B pixel in the four columns as shown in FIG. 22. Subsequently, the same procedure continues for the other image rows in the sensor.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of processing raw image pixel information, comprising:
applying a first integrated decimation filter and raw image scaling filter to a first set of M columns of the raw image pixel information, wherein the decimation filter operates in a time domain and the raw image scaling filter operates in a spatial domain; and
scaling the raw image pixel information by a factor of 1/N, wherein M and N are positive integers.

2. The method of claim 1, further comprising:
calculating, by the decimation filter, a weighted average of time samples.

3. The method of claim 1, further comprising:
calculating, by the raw image scaling filter, a weighted average of spatial samples.

4. The method of claim 1, further comprising:
capturing, by an image capturing device, the raw image pixel information.

5. The method of claim 1, further comprising:
communicating, by a data communication path, partial sums between the first integrated decimation filter and raw image scaling filter for the first set of M columns, and a second integrated decimation filter and raw image scaling filter for a second set of M columns.

6. The method of claim 1, further comprising:
prior to the step of applying the first integrated decimation filter and raw image scaling filter, converting, by a sigma-delta analog-to-digital modulator, the raw image pixel information.

7. The method of claim 1, wherein the raw image pixel information includes sigma-delta modulated pixel values.

8. The method of claim 1, wherein M ≠ N.

9. An image processing circuit, comprising:
a first integrated decimation filter and raw image scaling filter configured to process raw image pixel information for a first set of M columns of raw image pixel information, wherein the decimation filter operates in a time domain and the raw image scaling filter operates in a spatial domain, and configured to scale the raw image pixel information by a factor of 1/N,
wherein M and N are positive integers.

10. The image processing circuit according to claim 9, wherein the decimation filter is further configured to calculate a weighted average of time samples.

11. The image processing circuit according to claim 9, wherein the raw image scaling filter is configured to calculate a weighted average of spatial samples.

12. The image processing circuit according to claim 9, wherein the raw image pixel information is information captured from an image capturing device.

13. The image processing circuit according to claim 9, further comprising:
a second integrated decimation filter and raw image scaling filter configured to process raw image pixel information for a second set of M columns of raw image pixel information; and
a data communication path configured to communicate partial sums between the first integrated decimation filter and raw image scaling filter and the second integrated decimation filter and raw image scaling filter.

14. The image processing circuit according to claim 9, further comprising a sigma-delta analog-to-digital modulator configured to modulate the raw image pixel information.

15. The image processing circuit according to claim 9, wherein the raw image pixel information includes sigma-delta modulated pixel values.

16. The image processing circuit according to claim 9, wherein M ≠ N.

17. An imaging device, comprising:
an image capturing device including a pixel array having at least 2M columns; and
a first sigma-delta analog-to-digital converter including a first integrated decimation filter and raw image scaling filter configured to process raw image pixel information configured to process raw image pixel information for a first set of M columns of raw image pixel information, wherein the decimation filter operates in a time domain and the raw image scaling filter operates in a spatial domain, and configured to scale the raw image pixel information by a factor of 1/N,
wherein M and N are positive integers.

18. The imaging device according to claim 17, wherein the decimation filter is further configured to calculate a weighted average of time samples.

19. The imaging device according to claim 17, wherein the raw image scaling filter is configured to calculate a weighted average of spatial samples.

20. The imaging device according to claim 17, further comprising:
a second sigma-delta analog-to-digital converter including a second integrated decimation filter and raw image scaling filter configured to process raw image pixel information for a second set of M columns of raw image pixel information; and
a data communication path configured to communicate partial sums between the first integrated decimation filter and raw image scaling filter and the second integrated decimation filter and raw image scaling filter.

* * * * *